(12) United States Patent
Strunck et al.

(10) Patent No.: US 11,822,344 B2
(45) Date of Patent: Nov. 21, 2023

(54) METHOD AND DEVICE FOR THE DECENTRALIZED COOPERATIVE COORDINATION OF VEHICLES

(71) Applicant: Continental Teves AG & Co. oHG, Frankfurt am Main (DE)

(72) Inventors: Sebastian Strunck, Niedernhausen (DE); Thomas Grotendorst, Eschborn (DE); Jonas Schönichen, Weiterstadt (DE)

(73) Assignee: Continental Teves AG & Co. oHG

( * ) Notice: Subject to any disclaimer, the term of this patent is extended or adjusted under 35 U.S.C. 154(b) by 263 days.

(21) Appl. No.: 16/259,324

(22) Filed: Jan. 28, 2019

(65) Prior Publication Data

US 2019/0243381 A1    Aug. 8, 2019

(30) Foreign Application Priority Data

Feb. 2, 2018    (DE) ...................... 10 2018 201 646.1

(51) Int. Cl.
*G01C 22/00* (2006.01)
*G05D 1/00* (2006.01)
(Continued)

(52) U.S. Cl.
CPC ......... *G05D 1/0289* (2013.01); *G05D 1/0212* (2013.01); *G08G 1/096791* (2013.01);
(Continued)

(58) Field of Classification Search
CPC ............... G05D 1/0289; G05D 1/0212; G05D 2201/0213; G08G 1/096791; G08G 1/162;
(Continued)

(56) References Cited

U.S. PATENT DOCUMENTS

| 10,964,216 B2 * | 3/2021 | Buburuzan ............ G08G 1/161 |
| 11,243,532 B1 * | 2/2022 | Levihn ................... G06N 3/045 |

(Continued)

FOREIGN PATENT DOCUMENTS

| DE | 102007058538 A1 | 6/2009 |
| DE | 102015219469 A1 | 4/2016 |

(Continued)

OTHER PUBLICATIONS

German Examination Report for German Application No. 10 2018 201 646.1, dated Dec. 5, 2018—8 pages.

*Primary Examiner* — Robert T Nguyen
*Assistant Examiner* — Sohana Tanju Khayer
(74) *Attorney, Agent, or Firm* — RatnerPrestia

(57) ABSTRACT

A method and corresponding device for the decentralized cooperative coordination of at least two vehicles includes: determining an abstract driving maneuver to realize at least one nominal driving maneuver by a first vehicle, determining driving maneuver information regarding the first vehicle's at least one abstract driving maneuver, transmitting the first vehicle's driving maneuver information to at least one further vehicle, calculating or reconstructing the first vehicle's nominal trajectory and/or nominal driving maneuver based on the received driving maneuver information by the further vehicle, comparing the first vehicle's reconstructed nominal trajectory and/or the reconstructed nominal driving maneuver with the further vehicle's nominal trajectory and/or nominal driving maneuver and, if a conflict exists between the nominal trajectory and/or the nominal driving maneuver of the first vehicle and the nominal trajectory and/or the nominal driving maneuver of the further vehicle, transmitting a cooperation request and/or information indicating the conflict to the first vehicle.

15 Claims, 2 Drawing Sheets

(51) Int. Cl.
*G05D 1/02* (2020.01)
*G08G 1/0967* (2006.01)
*G08G 1/16* (2006.01)
*B60W 30/16* (2020.01)
*G08G 1/01* (2006.01)
*G08G 1/056* (2006.01)
*G08G 1/00* (2006.01)

(52) U.S. Cl.
CPC ............ *G08G 1/162* (2013.01); *B60W 30/16* (2013.01); *G05D 2201/0213* (2013.01); *G08G 1/0108* (2013.01); *G08G 1/056* (2013.01); *G08G 1/166* (2013.01); *G08G 1/167* (2013.01); *G08G 1/22* (2013.01)

(58) Field of Classification Search
CPC ...... G08G 1/0108; G08G 1/056; G08G 1/166; G08G 1/167; G08G 1/22; B60W 30/16
See application file for complete search history.

(56) References Cited

U.S. PATENT DOCUMENTS

| | | | |
|---|---|---|---|
| 2017/0236421 A1* | 8/2017 | Yang | B60W 30/095 701/301 |
| 2017/0288886 A1* | 10/2017 | Atarius | H04L 47/20 |
| 2017/0345308 A1 | 11/2017 | Buburuzan et al. | |
| 2018/0233040 A1* | 8/2018 | Zydek | B60W 30/00 |
| 2018/0321689 A1* | 11/2018 | Lehmann | G05D 1/0212 |
| 2019/0004523 A1* | 1/2019 | Bills | G08G 1/166 |
| 2019/0098471 A1* | 3/2019 | Rech | G08G 1/22 |
| 2020/0027345 A1* | 1/2020 | Zydek | G08G 1/09623 |
| 2020/0126420 A1* | 4/2020 | Sohn | G08G 1/163 |

FOREIGN PATENT DOCUMENTS

| | | |
|---|---|---|
| DE | 102016205142 A1 | 10/2017 |
| DE | 102016209330 A1 | 11/2017 |
| WO | 2017076593 A1 | 5/2017 |

\* cited by examiner

METHOD AND DEVICE FOR THE DECENTRALIZED COOPERATIVE COORDINATION OF VEHICLES

CROSS REFERENCE TO RELATED APPLICATION

This application claims priority to German Patent Application No. 10 2018 201 646.1, filed Feb. 2, 2018, the contents of such application being incorporated by reference herein.

FIELD OF THE INVENTION

The present invention relates to a method and a device for decentralized cooperative coordination.

BACKGROUND OF THE INVENTION

The laid-open patent application WO 2017076593 A1, incorporated herein by reference, discloses a method for the decentralized coordination of driving maneuvers of motor vehicles, wherein a planned trajectory and the desired trajectory of a motor vehicle are transmitted to other motor vehicles in the environment. The other motor vehicles check the received planned and desired trajectories to establish whether they collide with their own nominal trajectory and whether it would be advantageous to adapt their own nominal trajectory. If an adaptation is advantageous, the nominal trajectory is adapted and the driving behavior is amended accordingly. For its part, the motor vehicle originally outputting the information receives the planned and desired trajectories of the other motor vehicles and likewise adapts its nominal trajectory, if this is necessary and advantageous. This makes possible a complex evaluation of the possible adaptation of the driving behavior of the motor vehicle.

The disadvantage of this prior art is that the channel capacities of the vehicle-to-X communication will presumably be substantially working to capacity or will not be sufficient for the quantities of data to be communicated.

SUMMARY OF THE INVENTION

An aspect of the invention is a method and a device for decentralized cooperative coordination having an improved utilization of resources.

A method for the decentralized cooperative coordination of at least two vehicles is made available, comprising the following steps:
  Determination of at least one abstract driving maneuver in order to realize at least one nominal driving maneuver by a first vehicle,
  Determination of driving maneuver information regarding the at least one abstract driving maneuver by the first vehicle,
  Transmission of the driving maneuver information to at least one further vehicle by means of a vehicle-to-X interface of the first vehicle,
  Receipt of the driving maneuver information of the first vehicle by means of a vehicle-to-X interface of the further vehicle,
  Calculation or reconstruction of a nominal trajectory and/or of a nominal driving maneuver of the first vehicle on the basis of the received driving maneuver information by the further vehicle,
  Comparison of the reconstructed nominal trajectory and/or of the reconstructed nominal driving maneuver of the first vehicle with a nominal trajectory and/or a nominal driving maneuver of the further vehicle and, if a conflict exists between the nominal trajectory and/or the nominal driving maneuver of the first vehicle and the nominal trajectory and/or the nominal driving maneuver of the further vehicle,
  Transmission of a cooperation request and/or of information indicating the conflict to the first vehicle.

The idea which forms the basis of an aspect of this invention is that, for cooperative coordination between vehicles, the ego nominal trajectory based on specified abstracted driving maneuvers is notified in the form of driving maneuver information to other vehicles by means of vehicle-to-X communication, in order to describe the driving maneuvers to be executed. Here, an abstracted driving maneuver serves in particular to describe a driving maneuver of a vehicle as fundamentally as possible. A vehicle within the meaning of an aspect of the invention is, in particular, a land vehicle, watercraft and/or aircraft, for example a car, motorcycle, ship, boat or airplane.

A nominal trajectory within the meaning of an aspect of the invention is intended to designate a trajectory which is lane-precise and which describes the currently planned driving trajectory. In particular, lane precision describes the relatedness to a respective lane of a roadway, which is being travelled on, such that curvatures of the lane during the course can also be considered by a lane-precise (nominal) trajectory.

A nominal driving maneuver within the meaning of an aspect of the invention means a driving maneuver which is planned for a defined point in time or period of time and a defined position or area. Unlike the description by means of trajectories, a driving maneuver refers to a defined point in time or period of time and a defined position or area, without assigning a time to any geographical point on a route in this case.

A trajectory shall designate a possible driving route below. The trajectory mathematically describes a geographical route. A time which indicates when the motor vehicle may pass this point can be assigned to any geographical point on this route. If such a trajectory represents the planned maneuver of a vehicle, it allows a prediction to be made regarding the position at which said vehicle will be located at a specific point in time.

An abstract driving maneuver within the meaning of an aspect of the invention means an abstracted representation in order to realize at least one instruction to be executed. Instructions within this meaning are, for example, a modification of the driving dynamics of a vehicle. The representation in driving maneuvers consequently makes it possible to substantially conserve resources.

In particular, a conflict between the nominal trajectory and/or the nominal driving maneuver of the first vehicle and the nominal trajectory and/or the nominal driving maneuver of the further vehicle means a spatial and temporal meeting of the planned courses or driving maneuvers—in other words, if, during the further course of movement of the relevant vehicles, an at least partial overlapping (collision) of the vehicles and/or of predefined safety zones around the vehicles would occur.

In accordance with one embodiment, a substantiation of the at least one determined abstract driving maneuver is carried out with regards to the respective situation in order to determine the driving maneuver information. For example, this is effected by enriching the information with driving dynamics change values or absolute values, which are to be applied to the relevant situation. This operation can be effected in the computer-implemented realization, for example by instantiation of an object (substantiated driving maneuver) from one class (abstracted driving maneuver), or can be illustrated by this. For example, in the event of the vehicle turning, an explicit curvature of a bend or an angle and the speed to be driven are specified. The driving maneuver information also expediently has a degree of abstraction. By way of example, a further vehicle can simply reconstruct a nominal trajectory or nominal driving maneuver of the first vehicle on the basis of detailed vehicle component instructions such as, for example, an instruction to increase the braking pressure by a certain amount, if more extensive information about the condition of the vehicle is transmitted. The degree of abstraction accordingly serves, in particular, to make optimum use of the channel capacities of the vehicle-to-X communication. The basic idea of the transferred driving maneuver information is therefore to attain a specific reconstruction of the nominal trajectory/nominal driving maneuver based on the transferred information of the relevant driving maneuver, with the smallest possible quantities of data. Due to the consequently comparatively low quantity of data to be exchanged, channel capacities of the vehicle-to-X communication as well as resources of the vehicles can, as such, be saved to a considerable extent.

The driving maneuvers can, in principle, be executed automatically or manually, wherein in the case of manual execution, a list of driving maneuvers can be provided which can be issued to the driver as driving instructions.

The cooperation request or the information indicating the conflict is expediently output in the form of a vehicle-to-X message, wherein said message can comprise at least one suitably characterized item of driving maneuver information. Furthermore, an identifier which identifies the relevant vehicle can be comprised.

According to one embodiment, a nominal trajectory of the first vehicle is determined by the first vehicle prior to the determination of at least one abstract driving maneuver in order to realize at least one nominal driving maneuver.

If a conflict exists between the nominal trajectory and/or the nominal driving maneuver of the first vehicle and the nominal trajectory and/or the nominal driving maneuver of the further vehicle, the first vehicle and/or the further vehicle, according to one embodiment of the method, carries/carry out calculations with regards to at least one possible option for adapting the nominal trajectory and/or the nominal driving maneuver.

According to one further development, the calculation is made by the vehicle receiving the cooperation request and/or the information indicating the conflict.

In accordance with one embodiment, the vehicle receiving the cooperation request and/or the information indicating the conflict carries out a check as to whether cooperation with the further vehicle is to be supported. Here, the check can be carried out automatically and/or with manual support.

If cooperation with the further vehicle is to be supported, the first vehicle transmits, in accordance with one embodiment, driving maneuver information which is adapted on the basis of a determination of at least one abstract driving maneuver, in order to realize at least one adapted nominal driving maneuver.

In accordance with another embodiment, the further vehicle executes, following receipt of the adapted driving maneuver information, the nominal trajectory and/or the nominal driving maneuver or a nominal trajectory which is adapted to the adapted driving maneuver information and/or an adapted nominal driving maneuver. Consequently, a decentralized coordination of driving maneuvers which are to be executed by the relevant vehicles takes place.

In accordance with one embodiment, a selection of at least one abstract driving maneuver is made from a list of different abstract driving maneuvers for the determination of at least one abstract driving maneuver.

In accordance with one further development, a sequence in the order of execution is compiled from the selection of the driving maneuvers. The sequence can in particular be taken into consideration during the selection step such that the driving maneuvers are selected based on the order in which they are to be executed.

In accordance with one embodiment, the list of different driving maneuvers is provided in a data memory. Here, the data memory can be provided as a data memory inside the vehicle and/or as a data memory external to the vehicle.

In accordance with one embodiment, a summarized list of driving maneuver information of a plurality of driving maneuvers to be executed is transmitted by the first vehicle to the further vehicle. The selection is made, according to a further development, in accordance with a sequence of the driving maneuvers.

In accordance with one embodiment, a distinction of the abstract driving maneuvers between longitudinal and transverse maneuvers can in principle be provided. In particular, combined abstract driving maneuvers, e.g. longitudinal and transverse maneuvers, can be superimposed.

The abstract driving maneuver can, according to one embodiment, be divided into the categories of transverse, longitudinal and/or further driving maneuvers.

Amongst others, the following can be regarded as abstract driving maneuvers:
Following a lane,
Maintaining a speed,
Deceleration,
Acceleration,
Lane change,
Turning (left, right),
Standstill (being stationary or parked),
Driving into or pulling out of a parking space, and/or
Initiating, maintaining or breaking up a queue.

Here, following a lane describes a (nominal) trajectory which follows a lane of a roadway or which is related thereto, in particular irrespective of a possible curvature of the lane or of the roadway.

According to one embodiment, combinations of abstract driving maneuvers can be provided which are temporally and/or spatially superimposed or which are to be executed successively. For example, one possible example is a simultaneous execution of a transverse maneuver, such as e.g. a lane change, and a longitudinal maneuver, e.g. acceleration.

Further examples are:
Longitudinal maneuvers: deceleration in conjunction with acceleration;
Transverse maneuvers: lane change in conjunction with going straight on in conjunction with turning.

Furthermore, according to one embodiment, combinations of abstract driving maneuvers can be provided as a definition of an abstract driving maneuver.

In accordance with one embodiment, the nature of a driving maneuver, the position of the start of the driving maneuver, the time of the start of the driving maneuver and/or the temporal or spatial length of the driving maneuver are output as driving maneuver information.

The transmitted positions are provided, according to one embodiment, in the form of coordinates of a global satellite navigation system. In particular, it can also be provided that relative coordinates are used in relation to the relevant further vehicle during cooperative coordination.

According to another embodiment, it is provided that in particular if a roadway which is being traveled on has multiple lanes, the driving maneuver information comprises information in order to establish which lane of the roadway is occupied.

According to one further development, an arrangement of the lane occupied by the vehicle relative to further lanes of the roadway can, in this case, be used as information to be transferred regarding this. As a result, the position of the vehicle can be considered in a lane-precise manner, which can in particular be relevant for those situations where no sufficiently precise information can be calculated with respect to the situation or where there is no need for this. Furthermore, at least one coordinate indication could be dispensed with due to the lane-precise resolution. As a result, errors arising from deviating coordinate systems of the vehicles can be limited.

In accordance with one embodiment, in the event of the first vehicle and/or the further vehicle following a lane, no driving maneuver information is output. Here, it is assumed that information regarding going straight on or the planned trajectory for a further vehicle receiving said information can already be determined based on the at least one identifier and a message comprising a position such as e.g. a "Cooperative Awareness Message" or CAM message (Europe) and a "Basic Safety Message" or BSM message (USA). It should be mentioned that it can alternatively be provided that driving maneuver information is also to be output when going straight on. This makes it possible for vehicles which are ready to cooperate to be made known to other vehicles.

In accordance with one embodiment, the same driving maneuver information is repeatedly output. This makes it possible for those vehicles, which have arrived within communication range following the initial outputting of the driving maneuver information, to likewise acquire knowledge of the planned maneuver and, in addition, makes it possible to compensate for any data losses during the communication.

In accordance with one embodiment, in the event of a planned driving maneuver changing after an initial outputting of driving maneuver information, driving maneuver information relating to the changed planned driving maneuver is output. In addition, it can be provided that driving maneuver information focused on the aborting or the non-initiation of the relevant driving maneuver is output. This can in particular be provided in the event of going straight on instead of the originally planned driving maneuver, so that the further vehicles are clear about the planning of the vehicle outputting the information.

In accordance with one embodiment, the driving maneuver information is embedded in at least one already existing type of message which is usually output repeatedly such as, for example, the CAM or the BSM. As a result, a considerable additional burden on the resources is avoided. Additionally or alternatively, the driving maneuver information is transmitted by means of message types which are in particular provided exclusively for this purpose.

In accordance with one embodiment, it is provided that information regarding a cooperation status and/or the amendment thereof is to be output in the form of at least one status indicator. These can be so-called status indicators or "flags" which can be transferred in a particularly resource-conserving manner since, for example, a single bit can, as such, be sufficient to display a status. The sender and receiver should therefore have a consistent understanding of the status information, that is to say which status is defined by the relevant status information. Accordingly, at least one further item of information can be provided for the assignment in addition to the actual status information.

Examples of status are:

Cooperation request: in particular, if a planned driving maneuver of the first vehicle conflicts with the determined trajectory of at least one further vehicle, one of the vehicles involved could consequently be induced to cooperate in order to resolve said conflict.

Confirmation: one further vehicle requested by the first vehicle adapts its own trajectory, taking into account the trajectory of the first vehicle and confirms this by transferring the relevant status information.

According to one embodiment, in the event of a conflict between the nominal trajectory and/or the nominal driving maneuver of the first vehicle and the nominal trajectory and/or the nominal driving maneuver of the further vehicle, prevailing road traffic rules are accordingly taken as the basis in order to resolve the conflict. This is effected in particular in the case of colliding maneuver plans of the vehicle and of the at least one further vehicle. This basic assumption is particularly advantageous for resolving the conflict. As a result, a further vehicle which is asked to cooperate can, for example, assume that a fallback plan in accordance with the rules does exist, so that it does, in principle, have the option of refusing to cooperate or not adapting its own maneuver plan.

The prevailing road traffic rules, e.g. the Traffic Code, mean that one vehicle usually has priority in a specific traffic situation. Any conflicts of the nominal trajectories which occur can consequently, by way of example, also be resolved by refusing a cooperation request, if, for example, a resulting priority is to be utilized without restriction.

A device is further described in a first vehicle for decentralized cooperative coordination with at least one further vehicle, comprising:
  a maneuver planning apparatus for determining at least one abstract driving maneuver in order to realize at least one nominal driving maneuver, wherein the maneuver planning apparatus is furthermore configured to determine driving maneuver information regarding the at least one abstract driving maneuver,
  a maneuver coordination apparatus for transmitting the driving maneuver information to at least one further vehicle via a vehicle-to-X interface, wherein the maneuver coordination apparatus is configured to receive driving maneuver information of the further vehicle by means of the vehicle-to-X interface and to reconstruct a nominal trajectory and/or a nominal driving maneuver of the further vehicle on the basis of the received driving maneuver information and to compare the reconstructed nominal trajectory and/or the reconstructed nominal driving maneuver of the further vehicle with a nominal trajectory and/or a nominal driving maneuver of the first vehicle and, if a conflict exists between the nominal trajectory and/or the nominal driving maneuver of the first vehicle and the nominal trajectory and/or the nominal driving maneuver of the further vehicle, to transmit a cooperation request and/or information indicating the conflict to the first vehicle.

According to another aspect of the invention, the device is set up to perform a method according to at least one of the above embodiments.

In one further development of the indicated device, the indicated device has a memory and a processor. In this case, the indicated method is lodged in the memory in the form of a computer program and the processor is provided to execute the method if the computer program is loaded from the memory into the processor.

According to another aspect, the computer program comprises programming code means in order to perform all of the steps of one of the indicated methods if the computer program is run on a computer or one of the indicated devices.

According to a further aspect of the invention, the computer programming product includes a programming code which is stored on a computer-readable data carrier and which, if it is run on a data processing apparatus, performs one of the indicated methods.

BRIEF DESCRIPTION OF THE DRAWINGS

Some particularly advantageous configurations of aspects of the invention are indicated in the subordinate claims. Further preferred embodiments are also set out by the following description of embodiment examples with reference to figures, wherein:

DETAILED DESCRIPTION OF THE PREFERRED EMBODIMENTS

Figure 1:
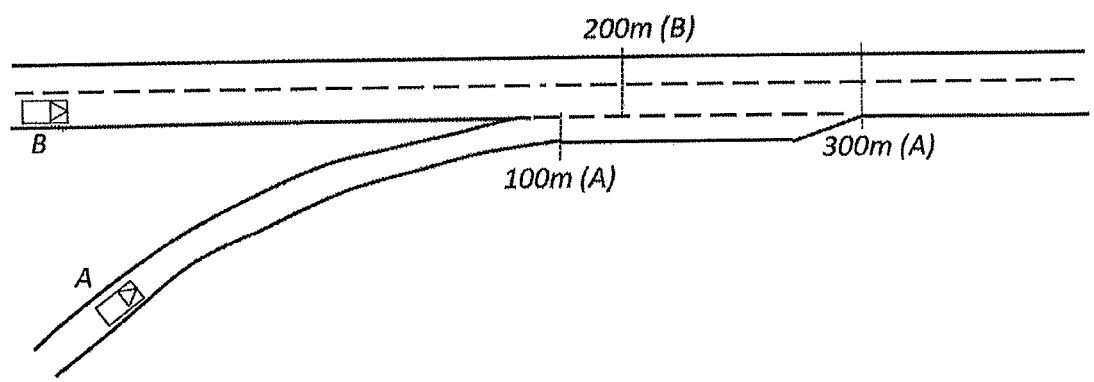
FIG. 1 shows a schematic representation of a traffic situation in order to explain one embodiment of the method.

FIG. 1 shows a schematic representation of a traffic situation as vehicle A joins a motorway, along which vehicle B is moving. A decentralized coordination is subsequently carried out between vehicles A and B in order to coordinate the respective driving maneuvers, with the aim of realizing the nominal trajectories of vehicle A and vehicle B for the merging maneuver of vehicle A in a conflict-free manner.

Figure 2:
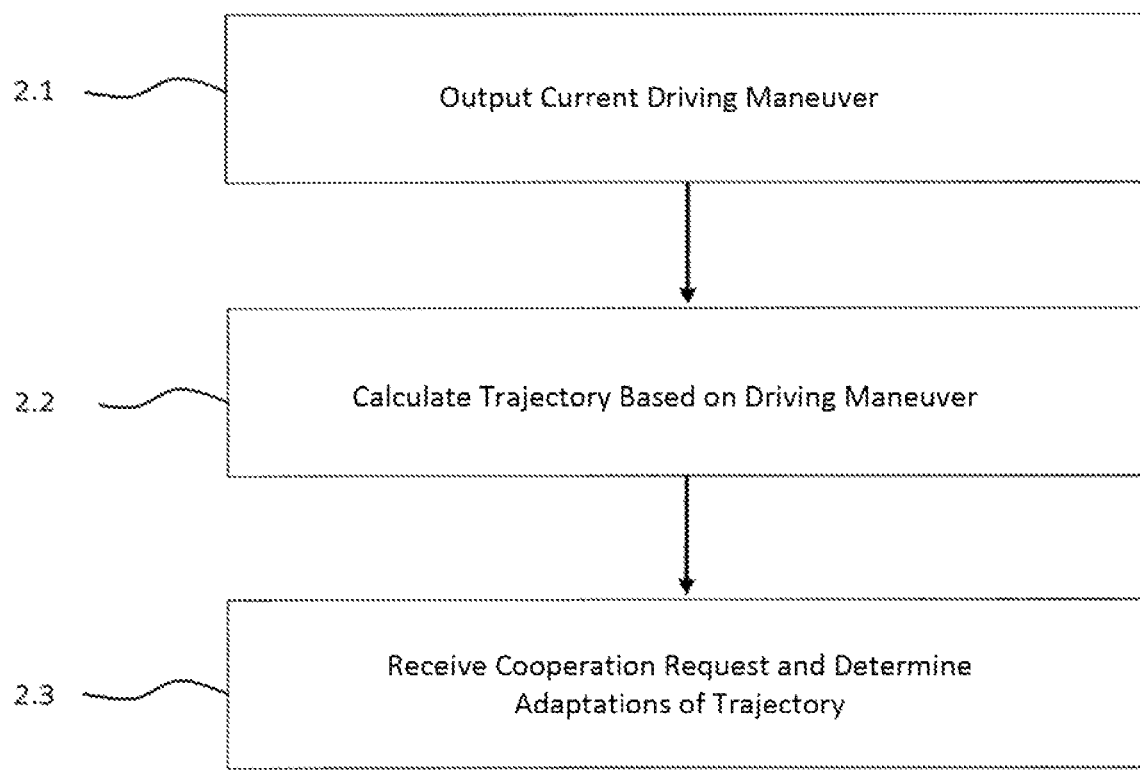
FIG. 2 shows an exemplary procedure for the decentralized maneuver coordination based on the traffic situation according to FIG. 1.

An exemplary procedure for the decentralized driving maneuver coordination between vehicle A and vehicle B, which refers to the traffic situation according to FIG. 1, is described below with reference to FIG. 2. The transferred abstract driving maneuver information shown is, in this case, indicated in an exemplary descriptive manner, wherein merely that information which is considered to be expedient for explaining the procedure is indicated. The distance indications mentioned are in this case governed by the distances represented in FIG. 1, the vehicle assignment of which is indicated in brackets.

In step 2.1, vehicle A outputs current driving maneuver information in conjunction with position information, Pos., by means of vehicle-to-X communication. The output information furthermore comprises an identifier ID of the relevant vehicle which, if necessary, makes it possible to respond directly in order to coordinate driving maneuvers:
<ID: A|Pos. A|Follow lane at 16 m/s>

Vehicle B likewise outputs driving maneuver information in conjunction with position information by means of vehicle-to-X communication:
<ID: B|Pos. B|Follow lane at 33 m/s>

Usually, standardized messages such as, for example, a "Cooperative Awareness Message" or CAM message (Europe) or a "Basic Safety Message" or BSM message (USA) are output periodically, wherein said messages likewise comprise at least information regarding the identification of the sender and position, based on which a trajectory can essentially be reproduced. Accordingly, the transmitting of a message can be dispensed with in the event of a vehicle going straight on, inasmuch as no intervention which substantially modifies the driving dynamics of the vehicle is made. The nominal trajectory can nevertheless be determined, based on the data transferred by means of the CAM or BSM message.

In step 2.2, vehicle A calculates the nominal trajectory of vehicle B on the basis of the driving maneuver information received from vehicle B, wherein a conflict situation is ascertained by comparing this with its own nominal trajectory. In accordance with the underlying road traffic regulations vehicle B has priority in the present situation, which is why vehicle A would, in principle, have to adapt its own nominal trajectory. Due to the fact that vehicle B has priority and vehicle A has to adapt its nominal trajectory, it can be regarded as an obligation for vehicle A to bring about cooperation.

By means of a cooperation request to vehicle B, vehicle A attempts to bring about an adaptation of the nominal trajectory of vehicle B, the aim of which is to ensure that its own nominal trajectory can be retained in an unmodified form or in a form which is modified as little as possible.

According to the example, vehicle A sends the cooperation request, enlisting the identifier of vehicle B such that, in addition to the driving maneuver information, status information indicating the conflict is transferred.
<ID: A|Pos. A|in 100 m: Start of lane change at 20 m/s|in 280 m: End of lane change at 27 m/s|conflict with B>

In accordance with one embodiment, it can be provided that vehicle A additionally sends driving maneuver information regarding the alternatively planned driving maneuver which vehicle A will execute, if vehicle B refuses the cooperation request.

In step 2.3, vehicle B receives the cooperation request from vehicle A and determines, based on the driving maneuver information, possible adaptations of its own nominal trajectory, e.g. decelerating or changing lane. A cost function for describing the costs incurred by vehicle B as a result of the driving maneuver in question can be enlisted as a criterion for this. In this case, these costs are not necessarily exclusively of a monetary nature but can include, for example, petrol consumption, loss of time, loss of comfort. It should be borne in mind that a deviation from going straight on usually results in higher costs.

Vehicle B decides whether it would like to support the intention of A or not. This can be effected manually or automatically. The basis on which it can be automatically determined whether a request should be supported forms the subject matter of current research, and is therefore not the subject matter of the present application. According to the example, a monetary incentive or compensation could be created, wherein it should be borne in mind that this becomes superfluous if the result is consistent compensation throughout.

If vehicle B supports the cooperation request of vehicle A, vehicle B adapts its nominal trajectory, sends the driving maneuver information and executes an appropriate driving maneuver. Additionally, B can simultaneously provide confirmation of the cooperation, for example in the form of status information:
<ID: B|Pos. B|in 5 m: Follow lane with a deceleration of 1 m/s2|in 200 m: Follow lane at 27 m/s|confirmation A>

Vehicle A receives the information from vehicle B, identifies that the intended driving maneuver has been made possible and accordingly executes it or adapts its own nominal trajectory, taking account of the driving maneuver information provided. The driving maneuver information is repeatedly output during the execution of the maneuver, as a result of which further road users are or become informed about this.

If the request by vehicle A is refused, it can for example be provided that the remaining driving maneuver information is sent in conjunction with the refusal:

<ID: B|Pos. B|Follow lane at 33 m/s|refusal A>

In this case, vehicle A receives the information from vehicle B, identifies, based on the refusal information, that the intended driving maneuver has not been made possible and adapts its nominal trajectory, wherein the driving maneuver information is, here, also output repeatedly during the execution of the maneuver, in order to inform further road users about this.

If in the course of the proceedings it transpires that a feature or a group of features is not absolutely necessary, then the applicant here and now seeks a wording of at least one independent claim, no longer having the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The aspects of the invention expressly do not, however, exclude vehicle-to-X communication with the intermediary of, for example, a mobile network.

The invention claimed is:

1. A method for the decentralized cooperative coordination of a first vehicle and a second vehicle is made available, the method comprising:

determining, by a processor of the first vehicle, a list of first abstract driving maneuvers in order to realize a sequence of first planned driving maneuvers by the first vehicle, the sequence of first planned driving maneuvers including interventions into driving dynamics of the vehicle, the list of first abstract driving maneuvers including abstracted representations of the sequence of first planned driving maneuvers such that the list of first abstract driving maneuvers describes the planned interventions into the driving dynamics of the vehicle in an abstract format that excludes information relating the list of abstract driving maneuvers to a respective lane of a roadway, and thereby excludes a first planned trajectory associated with the sequence of first planned driving maneuvers, creating, by the processor of the first vehicle, driving maneuver information by combining the list of first abstract driving maneuvers with driving dynamics information for performing the sequence of first planned driving maneuvers, the driving maneuver information excluding the information relating the list of abstract driving maneuvers to the respective lane of the roadway, and thereby excluding the first planned trajectory associated with the sequence of first planned driving maneuvers, transmitting, by a first vehicle-to-X interface of the first vehicle, the driving maneuver information, receiving, by a second vehicle-to-X interface of the second vehicle, the driving maneuver information, reconstructing, by the processor of the second vehicle, the first planned trajectory associated with the sequence of first planned driving maneuvers of the first vehicle on the basis of the received driving maneuver information, the first planned trajectory including information relating the list of first abstract driving maneuvers to the respective lane of the roadway, comparing, by the processor of the second vehicle, the reconstructed first planned trajectory associated with the sequence of first planned driving maneuvers of the first vehicle with a second planned driving maneuver or a second planned trajectory of the second vehicle, and when the comparison indicates a conflict of the reconstructed first planned trajectory associated with the sequence of first planned driving maneuvers with the second planned driving maneuver or the second planned trajectory, avoiding the conflict by:

adjusting, by the first vehicle, the reconstructed first planned trajectory associated with the sequence of first planned driving maneuvers, or adjusting, by the second vehicle, the second planned driving maneuver or the second planned trajectory.

2. The method according to claim 1, wherein the first planned trajectory of the first planned driving maneuvers is determined by the first vehicle prior to the determination of the first abstract driving maneuvers in order to realize the first planned driving maneuvers.

3. The method according to claim 1, wherein the first vehicle or the second vehicle carries/carry out calculations regarding at least one possible option for adjusting the first planned maneuvers or the second planned driving maneuver if the conflict exists.

4. The method according to claim 1, wherein the first vehicle receiving the cooperation request or information indicating the conflict carries out a check as to whether a cooperation with the second vehicle is to be supported.

5. The method according to claim 4, wherein the second vehicle executes, following receipt of the driving maneuver information, the second planned driving maneuver.

6. The method according to claim 1, wherein, for the determination of the first abstract driving maneuvers, a selection of the first abstract driving maneuvers is made from a list of different abstract driving maneuvers.

7. The method according to claim 6, wherein the list of different driving maneuvers is provided in a data memory.

8. The method according to claim 1, wherein the nature of the first planned driving maneuvers, the position of the start of the first planned driving maneuvers, the time of the start of the first planned driving maneuvers or the temporal or spatial length of the first planned driving maneuvers is/are transferred in the driving maneuver information.

9. The method according to claim 1, wherein the driving maneuver information comprises information in order to establish which lane of a roadway is occupied.

10. The method according to claim 1, wherein in the case of the first or the second vehicle following a lane, no driving maneuver information is output.

11. The method according to claim 1, wherein the same driving maneuver information is output repeatedly.

12. The method according to claim 1, wherein the first abstract driving maneuver information is embedded in at least one already existing type of message which is usually output repeatedly.

13. The method according to claim 1, wherein it is provided that information about a cooperation status or the amendment thereof is to be output in the form of at least one status indicator.

14. The method according to claim 1, wherein when avoiding the conflict, the adjustment of the first planned driving maneuvers or the second planned driving maneuver are determined based on prevailing road traffic rules.

15. A device in a first vehicle for decentralized cooperative coordination with a second vehicle, comprising:
a maneuver planning apparatus for:
determining a list of first abstract driving maneuvers in order to realize a sequence of first planned driving maneuvers by the first vehicle, the sequence of first planned driving maneuvers including interventions into driving dynamics of the vehicle, the list of first abstract driving maneuvers including abstracted representations of the sequence of first planned driving maneuvers such that the list of first abstract driving maneuvers describes the planned interventions into the driving dynamics of the vehicle in an abstract format that excludes information relating the list of abstract driving maneuvers to a respective lane of a roadway, and thereby excludes a first planned trajectory associated with the sequence of first planned driving maneuvers, and
creating, by a processor of the first vehicle, first driving maneuver information by combining the list of first abstract driving maneuvers with driving dynamics information for performing the sequence of first planned driving maneuvers, the first planned driving maneuver information excluding the information relating the list of abstract driving maneuvers to the respective lane of the roadway, and thereby excluding the first planned trajectory associated with the sequence of first planned driving maneuvers; and
a maneuver coordination apparatus for:
transmitting the driving maneuver information to the second vehicle via a vehicle-to-X interface,
receiving second driving maneuver information of the further vehicle by the vehicle-to-X interface, the second driving maneuver information including a combination of:
a list of second abstract driving maneuvers including abstracted representations of a sequence of second planned driving maneuvers of the second vehicle such that the second abstract driving maneuvers consume less data than the sequence of second planned driving maneuvers of the second vehicle, and excludes information relating the list of second abstract driving maneuvers to a respective lane of a roadway, and thereby excludes a second trajectory associated with the sequence of second planned driving maneuvers from the second abstract driving maneuvers,
a driving dynamics information for performing the sequence of second planned driving maneuvers,
wherein the second driving maneuver information excludes the second planned trajectory of the second planned driving maneuvers from the list of second abstract driving maneuvers,
reconstructing the second planned trajectory of the sequence of second driving maneuvers of the second vehicle on the basis the received second driving maneuver information, the second planned trajectory including information relating the list of second abstract driving maneuvers to the respective lane of the roadway,
comparing the reconstructed second planned trajectory of the second vehicle with the first planned driving maneuvers or the first planned trajectory of the first vehicle, and
when the comparison indicates a conflict of the reconstructed second planned trajectory associated with the sequence of second planned driving maneuvers with the first planned driving maneuvers or the first planned trajectory, avoiding the conflict by:
adjusting the reconstructed first planned trajectory associated with the sequence of first planned driving maneuvers, or
adjusting the sequence of second planned driving maneuvers or the second planned trajectory.

* * * * *